(12) United States Patent
Jung et al.

(10) Patent No.: US 10,437,089 B2
(45) Date of Patent: Oct. 8, 2019

(54) DISPLAY DEVICE

(71) Applicant: SAMSUNG DISPLAY CO., LTD., Yongin-si, Gyeonggi-do (KR)

(72) Inventors: Minsu Jung, Asan-si (KR); Youngnam Kim, Asan-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 15/825,536

(22) Filed: Nov. 29, 2017

(65) Prior Publication Data
US 2018/0157092 A1    Jun. 7, 2018

(30) Foreign Application Priority Data

Dec. 6, 2016 (KR) ........................ 10-2016-0165145

(51) Int. Cl.
| | |
|---|---|
| *H05K 5/00* | (2006.01) |
| *H05K 7/00* | (2006.01) |
| *G02F 1/1333* | (2006.01) |
| *B32B 17/10* | (2006.01) |
| *H04M 1/02* | (2006.01) |

(52) U.S. Cl.
CPC .. *G02F 1/133308* (2013.01); *B32B 17/10036* (2013.01); *B32B 17/1055* (2013.01); *B32B 17/10293* (2013.01); *H04M 1/0266* (2013.01); *G02F 2001/13332* (2013.01); *G02F 2001/133314* (2013.01); *G02F 2001/133317* (2013.01); *G02F 2001/133325* (2013.01); *G02F 2001/133328* (2013.01); *G02F 2201/465* (2013.01)

(58) Field of Classification Search
CPC ....................................................... H05K 5/00
USPC ..................................................... 361/679.21
See application file for complete search history.

(56) References Cited

U.S. PATENT DOCUMENTS

| | | | |
|---|---|---|---|
| 8,199,488 B2 | 6/2012 | Zou et al. | |
| 8,587,935 B2 | 11/2013 | Lee | |
| 9,176,540 B2* | 11/2015 | Shin .................... | H04M 1/035 |
| 9,239,480 B2 | 1/2016 | Lee et al. | |

(Continued)

FOREIGN PATENT DOCUMENTS

| | | |
|---|---|---|
| EP | 2453301 A2 | 5/2012 |
| JP | 2011164185 A | 8/2011 |

(Continued)

OTHER PUBLICATIONS

Extended European Search Report for Application No. 17205329.0 dated Feb. 22, 2018.

*Primary Examiner* — Jerry Wu
(74) *Attorney, Agent, or Firm* — Cantor Colburn LLP

(57) ABSTRACT

A display device includes a display panel, a support frame including a plurality of straight portions located at two adjacent outer side surfaces of the display panel and having a substantially equal cross-section and a curved portion connecting the plurality of straight portions and having a curvature, a plurality of protrusion frames each extending from a straight portion of the plurality of straight portions of the support frame toward an inner portion of the display panel, and a mold portion overlapping the plurality of protrusion frames to be joined with the plurality of protrusion frames and being located along an inner surface of the curved portion of the support frame.

11 Claims, 10 Drawing Sheets

(56) References Cited

U.S. PATENT DOCUMENTS

| | | | |
|---|---|---|---|
| 2005/0212991 A1 | 9/2005 | Sugawara | |
| 2007/0293005 A1* | 12/2007 | Shigenobu | G06F 1/1616 |
| | | | 438/238 |
| 2008/0316121 A1* | 12/2008 | Hobson | H01Q 1/243 |
| | | | 343/702 |
| 2015/0261033 A1* | 9/2015 | Shin | H05K 5/0086 |
| | | | 349/58 |

FOREIGN PATENT DOCUMENTS

| | | |
|---|---|---|
| KR | 1020110054306 A | 5/2011 |
| KR | 1020130120753 A | 11/2013 |

* cited by examiner

DISPLAY DEVICE

This application claims priority to Korean Patent Application No. 10-2016-0165145, filed on Dec. 6, 2016, and all the benefits accruing therefrom under 35 U.S.C. § 119, the content of which in its entirety is herein incorporated by reference.

BACKGROUND

1. Field

Exemplary embodiments of the invention relate to an accommodating member of a display device for accommodating a display panel, a method of manufacturing the accommodating member and a display device including the accommodating member, and more particularly, to an accommodating member of a display device in which a metal frame having rigidity not to be deformed by an external impact and a resin mold portion for not transmitting heat generated by an inner driving device are unitarily provided, a method of manufacturing the accommodating member and a display device including the accommodating member.

2. Discussion of Related Art

In recent times, as an information society has advanced rapidly, there has been a need for flat panel display devices which have excellent characteristics such as slimness, light weight and low power consumption. Among the flat panel display devices, liquid crystal display ("LCD") devices are superior in resolution, color display, image quality, and the like and are widely applied to various electronic devices such as notebooks and desktop monitors.

In a typical LCD device, two substrates including electrodes respectively formed thereon are arranged so that surfaces on which the two electrodes are formed face each other, and a liquid crystal material is injected between the two substrates. Upon applying a voltage to the two electrodes, liquid crystal molecules may move based on an electric field generated by the voltage application. The LCD device may display an image based on a light transmittance that varies depending on the movement of the liquid crystal molecules.

Such a display device, particularly the flat panel display device, is widely used in small-sized portable display devices such as mobile phones, personal digital assistants ("PDAs") and portable multimedia players ("PMPs"), as well as large-sized display devices such as televisions ("TVs") or computer monitors. As a display panel for displaying an image includes a fragile material such as glass, the display panel is accommodated in an external accommodating member so that the display panel may not be damaged or deformed by external impact and stress.

SUMMARY

Exemplary embodiments of the invention may be directed to a display device capable of substantially preventing detachment between a metal frame and a resin mold portion, which are used as an accommodating member for a display device, when the metal frame and the resin mold portion are unitarily provided in an insert injection process and used for a relatively long time.

According to an exemplary embodiment, a display device includes a display panel, a support frame including a plurality of straight portions located at two adjacent outer side surfaces of the display panel and having a substantially equal cross-section and a curved portion connecting the plurality of straight portions and having a curvature, a plurality of protrusion frames each extending from a straight portion of the plurality of straight portions of the support frame toward an inner portion of the display panel, and a mold portion overlapping the plurality of protrusion frames to be joined with the plurality of protrusion frames and being located along an inner surface of the curved portion of the support frame.

In an exemplary embodiment, the straight portion and the curved portion of the support frame may have a substantially equal cross-sectional area.

In an exemplary embodiment, the straight portion and the curved portion of the support frame may be unitary.

In an exemplary embodiment, a protrusion frame of the plurality of protrusion frames and the straight portion of the support frame may be unitary.

In an exemplary embodiment, the mold portion may contact an inner side of the curved portion of the support frame.

In an exemplary embodiment, the support frame and the protrusion frame may include aluminum or an aluminum alloy.

In an exemplary embodiment, the mold portion may include at least one of resins based on polyethylene, polymethacryl, polyacryl, polyolefin, polyurethane, polyester and polyamide.

In an exemplary embodiment, the mold portion may include a material having lower thermal conductivity and superior ductility than those of the plurality of protrusion frames.

In an exemplary embodiment, a plurality of support holes arranged along an extending direction of the protrusion frame may be defined in the protrusion frame.

In an exemplary embodiment, the mold portion may cover at least one of an upper surface or a lower surface of the protrusion frame and fill an inside of a support hole of the plurality of support holes.

In an exemplary embodiment, the support hole may have a first opening having a first diameter and a second opening having a second diameter less than the first diameter.

In an exemplary embodiment, the support hole may have an opening of which a diameter continuously changes from the first diameter.

In an exemplary embodiment, the support hole may include at least one of a screw thread or a protruding portion therein.

In an exemplary embodiment, a coupling groove portion may be defined in at least one of an upper surface and a lower surface of the protrusion frame.

In an exemplary embodiment, the mold portion may fill an inside of the coupling groove portion.

In an exemplary embodiment, the coupling groove portion may be defined in both of the upper surface and the lower surface of the protrusion frame.

In an exemplary embodiment, the coupling groove portion located at the upper surface may be staggered from the coupling groove portion located at the lower surface.

In an exemplary embodiment, a surface roughness of the protrusion frame may be greater than a surface roughness of the support frame.

In an exemplary embodiment, the display device may further include a mold filling portion on the mold portion. The mold portion may contact an inner side of the curved portion of the support frame, and the mold filling portion may be located between the display panel and the curved portion of the support frame.

In an exemplary embodiment, the display panel may include a corner portion having a predetermined curvature, and a curvature of the corner portion and a curvature of the curved portion of the support frame may be different from each other.

In an exemplary embodiment, the mold filling portion may be located between the corner portion of the display panel and the curved portion of the support frame.

In an exemplary embodiment, the mold portion and the mold filling portion may be unitary.

According to an exemplary embodiment, a method of manufacturing a display device includes forming a support frame and a protrusion frame to be unitary by extruding a metal matrix, dividing a straight portion and a curved portion of the support frame, removing a portion of the protrusion frame located at the curved portion of the support frame, bending the curved portion of the support frame, placing the support frame and the protrusion frame at an injection mold frame, forming a mold portion coupled to the protrusion frame by injecting a resin to the injection mold frame, and bonding a display panel on the mold portion.

In an exemplary embodiment, the metal matrix may include aluminum.

In an exemplary embodiment, the resin included in the mold portion may include at least one of resins based on polyethylene, polymethacryl, polyacryl, polyolefin, polyurethane, polyester and polyamide.

In an exemplary embodiment, the method may further include increasing a surface roughness of the protrusion frame.

In an exemplary embodiment, the method may further include decreasing a surface roughness of the support frame.

In an exemplary embodiment, the method may further include defining a support hole or a coupling groove portion in the protrusion frame.

In an exemplary embodiment, the mold portion may be filled in the support hole or the coupling groove portion of the protrusion frame.

The foregoing is illustrative only and is not intended to be in any way limiting. In addition to the illustrative exemplary embodiments, exemplary embodiments and features described above, further exemplary embodiments, exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, in which.

DETAILED DESCRIPTION

Figure 1:
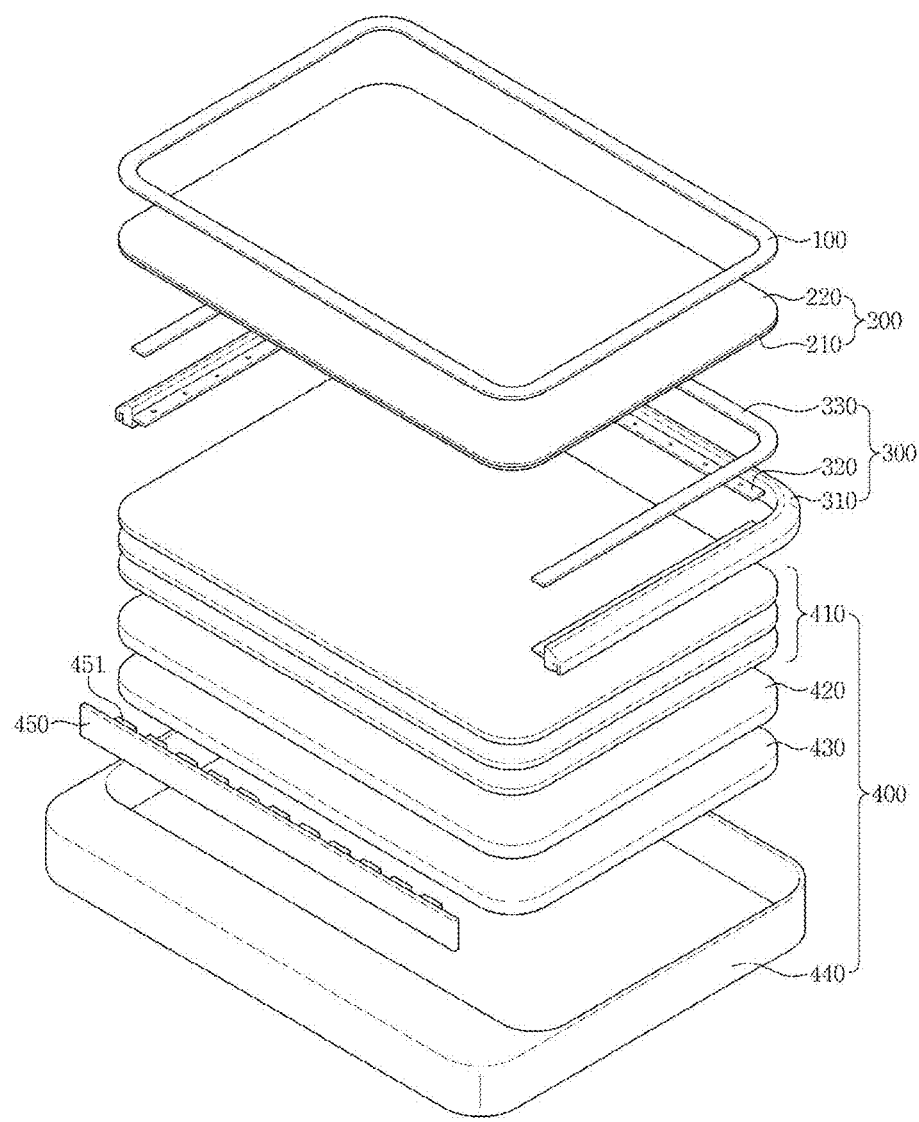
FIG. 1 is an exploded perspective view schematically illustrating an exemplary embodiment of a display device.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe embodiments of the invention and like reference numerals refer to like elements throughout the specification.

FIG. 1 is an exploded perspective view schematically illustrating a display device according to an exemplary embodiment.

The display device includes a display panel 200 displaying an image, a backlight assembly 400 providing a light to the display panel 200 and an intermediate frame 300 at which the display panel 200 is placed.

The display panel 200 displays an image. According to an exemplary embodiment, the display panel 200 is described as a liquid crystal display ("LCD") panel by way of example.

The display panel 200 includes a substrate having two pairs of sides parallel to each other. In addition, the display panel 200 has a pair of long sides and a pair of short sides which are parallel to each other, and a portion of the display panel 200 at which the long side and the short side meet each other is a curved portion, forming a round type structure.

The display panel 200 includes a first substrate 210, a second substrate 220 opposing the first substrate 210 and a liquid crystal layer (not illustrated) between the first substrate 210 and the second substrate 220. The display panel 200 includes, in a plan view, a display area (not illustrated) on which an image is displayed and a non-display area (not illustrated) which surrounds the display area and on which an image is not displayed. The non-display area may be covered by an upper frame 100.

In an exemplary embodiment, the display panel 200 may be fixedly supported by the intermediate frame 300 by using an adhesive layer (not illustrated).

The first substrate 210 of the display panel 200 may include a plurality of pixel electrodes (not illustrated) and a plurality of thin film transistors ("TFTs") (not illustrated) electrically connected in one-to-one correspondence with the pixel electrodes. A data line is connected to a source electrode of the TFT, a gate line is connected to a gate electrode of the TFT and a pixel electrode is connected to a drain electrode of the TFT. Each TFT switches a driving signal applied to a corresponding one of the pixel electrodes. In addition, the second substrate 220 may include a common electrode (not illustrated) which forms an electric field for controlling the arrangement of liquid crystals, together with the pixel electrodes. The display panel 200 drives the liquid crystal layer to display an image forward.

The display panel 200 includes a driving chip (not illustrated) applying driving signals, a driving chip mounting film (not illustrated) on which the driving chip is mounted and a printed circuit board ("PCB") (not illustrated) electrically connected to the display panel 200 through the driving chip mounting film (not illustrated). The driving chip mounting film may be a flexible PCB ("FPCB").

The driving chip generates the driving signal for driving the display panel 200 in response to an external signal. The external signal is a signal supplied from the PCB and the external signal may include an image signal, various control signals, a driving voltage and the like.

The intermediate frame 300 is coupled to a lower frame 440, supports a lower portion of the display panel 200 and protects a side surface of the display panel 200. The intermediate frame 300 includes a support frame 310 including a straight portion parallel to the long side and the short side of the display panel 200 and a curved portion connecting the straight portions, a protrusion frame 320 protruding from the straight portion of the support frame 310 to extend toward an inner portion of the display panel 200 and a mold portion 330 interposed between the protrusion frame 320 and the display panel 200 and unitarily coupled to the protrusion frame 320. The support frame 310 and the protrusion frame 320 may include a metal material having a suitable rigidity to substantially prevent twisting of the support frame 310 and the protrusion frame 320 and breakage of the display panel 200. In an exemplary embodiment, the mold portion 330 may include a polymer resin, e.g., a plastic, which may absorb impact applied to the display panel 200 and substantially prevent heat transfer. The intermediate frame 300 may be disposed to oppose four surfaces of the display panel 200 or to oppose three surfaces of the display panel 200 except for a driving unit area. In an alternative exemplary embodiment, an intermediate frame of which parts oppose two surfaces of the display panel 200 may be used in connection with each other. As illustrated in the drawings, the intermediate frame 300 opposing three surfaces of the display panel 200 may include one straight portion corresponding to a long side direction and two parallel straight portions corresponding to a short side direction. In addition, the straight portions are connected to each other by a curved portion between the straight portions, and a curvature of the curved portion corresponds to a curvature of a rounded portion of the display panel 200.

The backlight assembly 400 includes an optical sheet 410, a light guide plate 420, a reflective sheet 430, a lower frame 440 and a light source unit 450.

The optical sheet 410 is disposed above the light guide plate 420 and serves to diffuse and/or collimate a light directed from the light guide plate 420. The optical sheet 410 may include a plurality of optical sheets such as a diffusion sheet, a prism sheet and/or a protective sheet.

The light guide plate 420 receives the light emitted from a light source 451 through a light incidence side surface and emits the light toward a light emission surface. The light guide plate 420 uniformly supplies the light provided from the light source unit 450 to the display panel 200. The light guide plate 420 is used largely in the form of a substrate, but a film-type light guide plate may be used for slimness.

The reflective sheet 430 is disposed between the light guide plate 420 and the lower frame 440 and reflects a light emitted toward a lower portion of the light guide plate 420 to be directed toward the display panel 200 to improve luminous efficiency.

In an exemplary embodiment, the reflective sheet 430 may include, for example, polyethylene terephthalate ("PET") to have reflective properties and one surface of the reflective sheet 430 may be coated with a diffusion layer including, for example, titanium dioxide.

The lower frame 440 accommodates the reflective sheet 430 and the light guide plate 420. The lower frame 440 may include a rigid metal material such as stainless steel or a material having good heat dissipation properties such as aluminum or an aluminum alloy.

Figure 2:
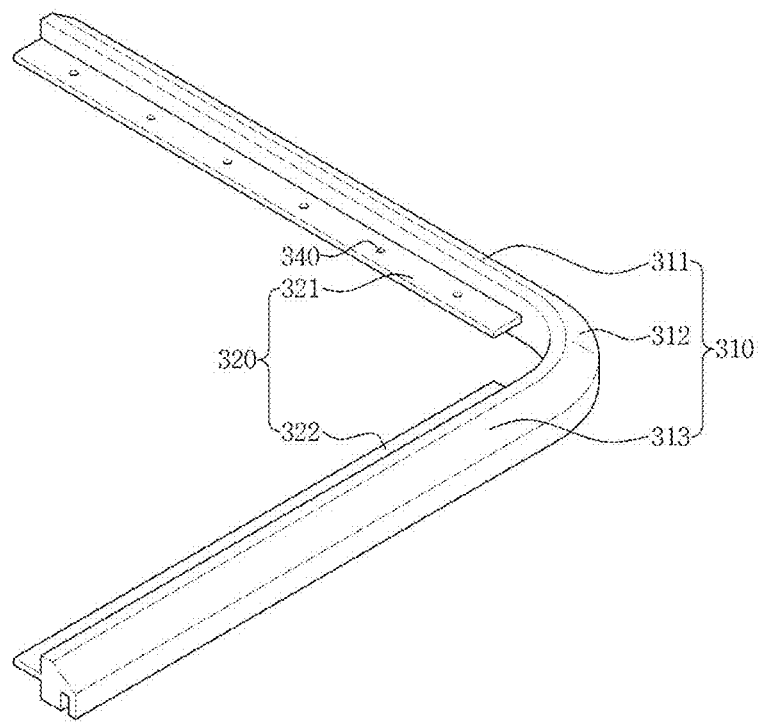
FIG. 2 is a perspective view illustrating an exemplary embodiment of a portion of an intermediate frame.

FIG. 2 is a perspective view illustrating a portion of the intermediate frame according to an exemplary embodiment.

FIG. 2 shows portions of the support frame 310 and the protrusion frame 320 located at a corner portion of the intermediate frame 300 (refer to FIG. 1). The support frame 310 has a shape corresponding to an outer line of the display panel 200 (refer to FIG. 1) and the display panel 200 may be positioned inside the support frame 310. The support frame 310 may include a first straight portion 311 extending along the long side direction of the display panel 200, a pair of second straight portions 313 extending along the short side direction of the display panel 200 and facing each other, and a curved portion 312 connecting the first straight portion 311 and the second straight portion 313 and forming a curved surface. The curved portion 312 may have a curvature corresponding to a curvature of a rounded corner portion of the display panel 200.

The protrusion frame 320 includes a first protrusion frame 321 protruding in the form of strip and extending along an inner side of the first straight portion 311 of the support frame 310 and a second protrusion frame 322 protruding in the form of strip and extending along an inner side of the second straight portion 313 of the support frame 310. Each of the first protrusion frame 321 and the second protrusion frame 322 has an upper surface on which the display panel 200 is placed and a lower surface opposite to the upper surface. The optical sheet 410 (refer to FIG. 1) may be positioned below the protrusion frame 320 and the display panel 200 may be positioned on the protrusion frame 320. The protrusion frame 320 protrudes to have a length less than a length of the non-display area of the display panel 200, thereby not blocking the light of the optical sheet 410 incident to the display area of the display panel 200.

A plurality of support holes 340 are defined in the protrusion frame 320, penetrating the protrusion frame 320 from the upper surface to the lower surface. The plurality of support holes 340 are spaced apart from each other along an extending direction of the protrusion frame 320 and serve to strengthen a coupling structure of the protrusion frame 320 and the mold portion 330 to be described below.

In an exemplary embodiment, the support frame 310 and the protrusion frame 320 may include a metal such as aluminum (AL) or a metal alloy so as to firmly support the display panel 200. In an exemplary embodiment, the support frame 310 and the protrusion frame 320 may be unitarily provided through an extrusion process using a metal member.

The protrusion frame 320 is located at an area of the straight portions 311 and 313 of the support frame 310 and is absent at an area of the curved portion 312.

Figure 3:
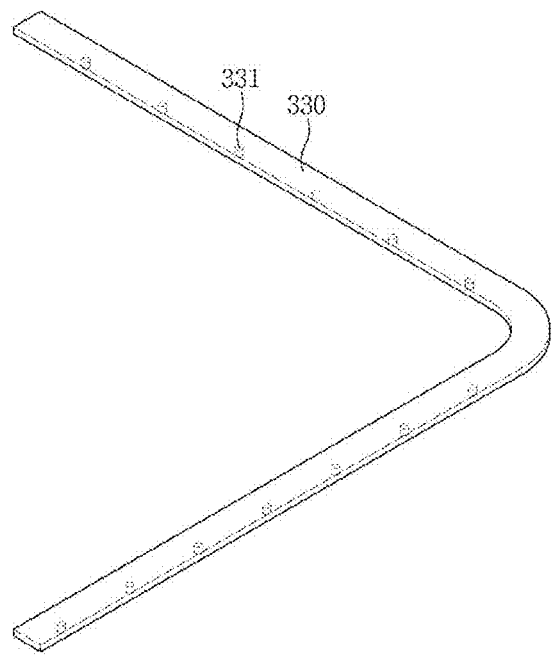
FIG. 3 is a perspective view illustrating an exemplary embodiment of a mold portion.

FIG. 3 is a perspective view illustrating the mold portion according to an exemplary embodiment.

Figure 4:
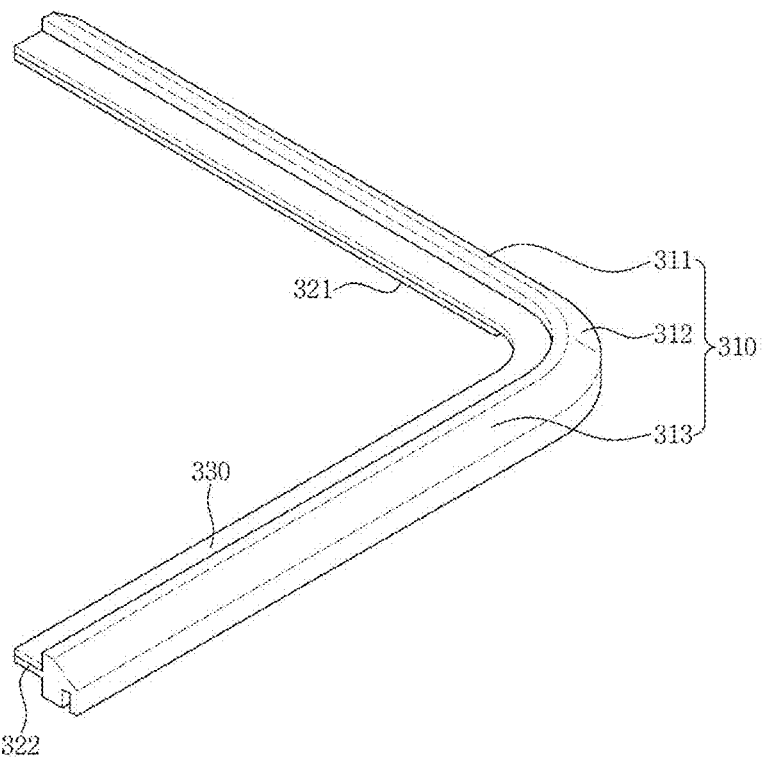
FIG. 4 is a perspective view illustrating an exemplary embodiment of an intermediate frame.

FIG. 4 is a perspective view illustrating the intermediate frame according to an exemplary embodiment.

Referring to FIGS. 3 and 4, the mold portion 330 is located inside the support frame 310 and is joined with the protrusion frame 320 (refer to FIG. 2) on the protrusion frame 320. The mold portion 330 supports a lower portion of the display panel 200 (refer to FIG. 1) and may be fixed to the display panel 200 using an adhesive layer. An adhesive layer (not illustrated) may be interposed between the mold portion 330 and the display panel 200.

The mold portion 330 includes a material having lower thermal conductivity and superior ductility than those of the protrusion frame 320. The mold portion 330 absorbs a part of impact transmitted to the display panel 200 from the protrusion frame 320 and substantially prevents a high heat generated from the driving chip or the like from being transmitted through the protrusion frame 320 including a metal material.

The mold portion 330 includes a material different from a metal material included in the protrusion frame 320, but is firmly joined with the protrusion frame 320. Specifically, the mold portion 330 may be joined with the protrusion frame 320 through an insert injection method in which a thermoplastic resin composition is injected to a metal member to be joined thereto.

Examples of the thermoplastic resin composition may include a polyolefin resin, a polymethacrylic resin such as a polymethyl methacrylate resin, a polyacrylic resin such as a polymethyl acrylate resin, a polystyrene resin, a polyvinyl alcohol-polyvinyl chloride copolymer resin, a polyvinyl acetal resin, a polyvinyl butyral resin, a polyvinyl formal resin, a polymethylpentene resin, a maleic anhydride-styrene copolymer resin, a polycarbonate resin, a polyphenylene ether resin, a polyether ether ketone resin, an aromatic polyether ketone such as a polyether ketone resin, a polyester resin, a polyamide resin, a polyamideimide resin, a polyimide resin, a polyetherimide resin, a styrene-based elastomer, a polyolefin-based elastomer, a polyurethane-based elastomer, a polyester-based elastomer, a polyamide-based elastomer, an ionomer, an aminopolyacrylamide resin, an isobutylene-maleic anhydride copolymer, ABS, ACS, AES, AS, ASA, MBS, an ethylene-vinyl chloride copolymer, an ethylene-vinyl acetate copolymer, an ethylene-vinyl acetate-vinyl chloride graft polymer, an ethylene-vinyl alcohol copolymer, a chlorinated polyvinyl chloride resin, a chlorinated polyethylene resin, a chlorinated polypropylene resin, a carboxyvinyl polymer, a ketone resin, an amorphous copolyester resin, a norbornene resin, a fluorine plastic, a polytetrafluoroethylene resin, a fluorinated ethylene-polypropylene resin, PFA, a polychlorofluoroethylene resin, an ethylene-tetrafluoroethylene copolymer, a polyvinylidene fluoride resin, a polyvinyl fluoride resin, a polyarylate resin, a thermoplastic polyimide resin, a polyvinylidene chloride resin, a polyvinyl chloride resin, a polyvinyl acetate resin, a polysulfone resin, a polyparamethylstyrene resin, a polyarylamine resin, a polyvinyl ether resin, a polyphenylene oxide resin, a polyphenylene sulfide ("PPS") resin, a polymethylpentene resin, oligoester acrylate, a xylene resin, a maleic acid resin, a polyhydroxybutyrate resin, a polysulfone resin, a polylactic acid resin, a polyglutamic acid resin, a polycaprolactone resin, a polyethersulfone resin, a polyacrylonitrile resin, a styrene-acrylonitrile copolymer resin, and the like. The aforementioned thermoplastic resins may be used singly or in combination of two or more. In addition, an auxiliary additive may be added in consideration of mechanical strength, heat resistance, adhesion, electrical properties, and the like.

The mold portion 330 may further include a coupling projection 331 filling the inside of the support hole 340 defined at the protrusion frame 320. The coupling projection 331 is provided by a part of the mold portion 330 filling the support hole 340 in the injection process. Although the coupling projection 331 having a linear shape is described by way of example in an exemplary embodiment, the shape of the coupling projection 331 filling the inside of the support hole 340 may vary according to the shape of the support hole 340.

Figure 5:
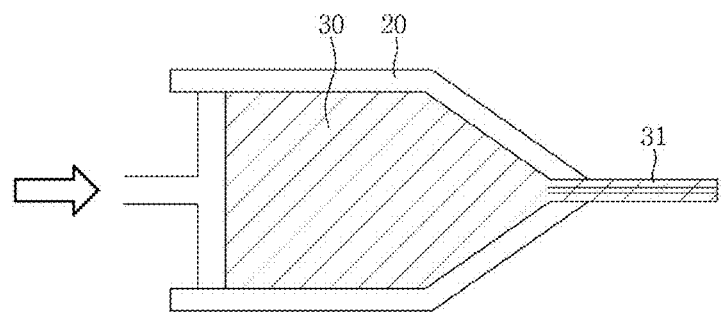
FIG. 5 is a view illustrating an exemplary embodiment of a process of manufacturing an intermediate frame base.

FIG. 5 is a view illustrating a process of manufacturing an intermediate frame base (e.g., a matrix of the intermediate frame) according to an exemplary embodiment.

Figure 6:
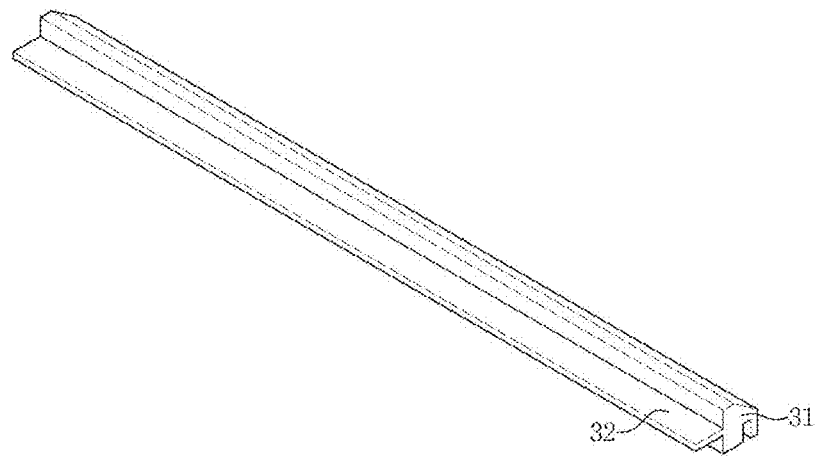
FIG. 6 is a perspective view illustrating an exemplary embodiment of the intermediate frame base.

FIG. 6 is a perspective view illustrating the intermediate frame base according to an exemplary embodiment.

Referring to FIG. 5, an intermediate frame base 31 according to an exemplary embodiment which forms the intermediate frame 300 (refer to FIG. 1) may be provided through an extrusion process.

In an exemplary embodiment, the extrusion process is a process in which structures having a predetermined cross-sectional shape are uniformly manufactured using a metal material such as aluminum. An aluminum alloy is largely used for the extrusion method. In an exemplary embodiment, an aluminum billet 30 is charged into an extruder 20 and extruded through a nozzle by applying heat and pressure. The extruded aluminum structure is manufactured to have a predetermined cross-section and a heat treatment process is performed thereon in a post-process to satisfy the mechanical properties of the material.

In an exemplary embodiment, aluminum alloys may be classified into 1000 series to 8000 series depending on the type and amount of the metal to be mixed, for example. That is, the aluminum alloys may be classified into 1000 series of pure aluminum (Al) having a purity of about 99.0% or more, 2000 series of an alloy series of aluminum (Al) and copper (Cu), 3000 series of an alloy series of aluminum (Al) and manganese (Mn), 4000 series of an alloy series of aluminum (Al) and silicon (Si), 5000 series of an alloy series of aluminum (Al) and magnesium (Mg), 6000 series of an alloy series of aluminum (Al), magnesium (Mg) and silicon (Si), 7000 series of an alloy series of aluminum (Al), zinc (Zn) and magnesium (Mg), and 8000 series of an alloy series of aluminum (Al) and other elements, for example.

In the case where the intermediate frame base 31 is manufactured by an extrusion method, a frame structure having excellent rigidity may be obtained at relatively low process cost. However, it is difficult to mold the intermediate frame base 31 into an unconstrained shape due to the fixed cross-sectional structure, as compared with the injection or press method.

Referring to FIG. 6, the intermediate frame base 31 is provided by an extrusion method and has a shape of a straight bar of which a cross-sectional shape and an area are constant.

When the intermediate frame base 31 is bent into a '[' shape, the structure becomes substantially the same as the structure of the intermediate frame 300. However, when bending the intermediate frame base 31 to form the curved portion 312, the intermediate frame base 31 may not be bent because a bending rigidity is large due to a protruding portion 32 at the bending area.

Figure 7:
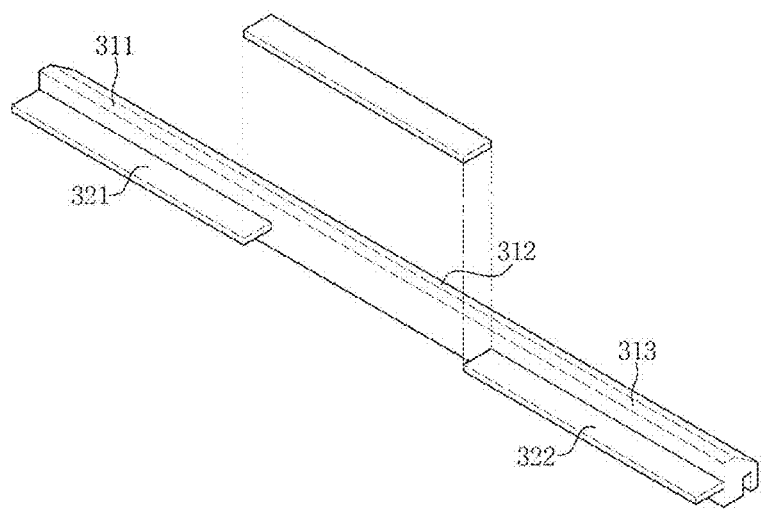
FIG. 7 is a perspective view illustrating an exemplary embodiment of the intermediate frame base from which a portion of a protrusion frame is removed.

FIG. 7 is a perspective view illustrating the intermediate frame base from which a part of the protruding portion is removed according to an exemplary embodiment.

Referring to FIG. 7, the support frame 310 (refer to FIG. 4) of the intermediate frame base 31 may be divided into the straight portions 311 and 313 and the curved portion 312 based on the provided shape.

The straight portions 311 and 313 are areas corresponding to the long side or the short side of the display panel 200 (refer to FIG. 1) and the curved portion 312 is an area corresponding to the corner portion of the display panel 200 which has a curvature.

In order to facilitate bending of the support frame 310, the protruding portion at an area corresponding to the curved portion 312 is removed. With respect to an area from which the protruding portion is removed, the first protrusion frame 321 and the second protrusion frame 322 are separated from each other.

Examples of methods to remove the protruding portion may include metal sawing, wire cutting, laser cutting, water jet cutting, or the like.

The metal sawing is a cutting method using an electric power saw blade whereby a processing product may be cut using a saw blade of a rotating type and a vertically movable type. The wire cutting is a processing technique causing a discharge between a processing product and a wire under a strong tension, which has an advantage of cutting with high precision. The laser cutting is a cutting method whereby a processing product is heated and melted using a laser beam and then the melted material is blown out using a high-pressure gas. The laser beam is irradiated with a focus size of several hundred micrometers to melt the processing product and the processing product is cut using an oxygen or nitrogen gas which is intensively irradiated coaxially with respect to the laser beam. The water jet cutting is a method whereby a high-pressure water pressed by a high-pressure pump is ejected through a water nozzle having a fine diameter to cut the processing product. The waterjet cutting may eject a pure water or eject a water including an abrasive.

Only the support frame 310 is left at a portion of the intermediate frame base 31 (refer to FIG. 6) from which the protruding portion is removed. A portion of the protrusion frame 320 corresponding to the straight portions 311 and 313 may be further removed in addition to the portion of the protrusion frame 320 corresponding to the curved portion 312 for securing a bending margin and facilitating the bending process.

Figure 8:
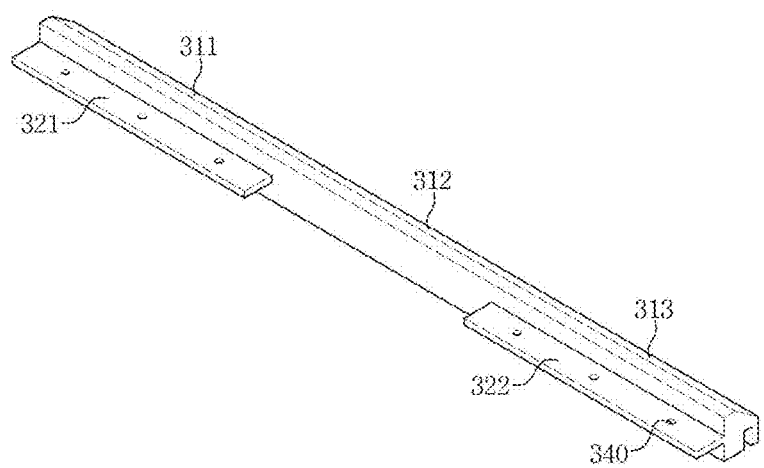
FIG. 8 is a perspective view illustrating an exemplary embodiment of the intermediate frame base having a support hole.

FIG. 8 is a perspective view illustrating the intermediate frame base having a support hole according to an exemplary embodiment.

Figure 14:
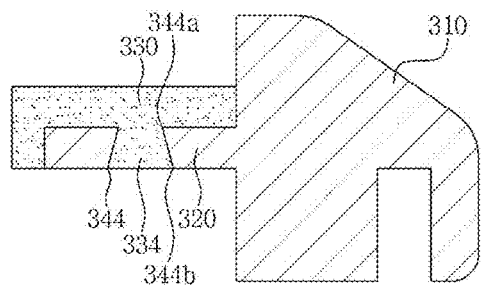
FIG. 14 is a cross-sectional view illustrating an exemplary embodiment of a coupling structure of a protrusion frame and a mold portion.

The support holes 340 are arranged along an extending direction of the protrusion frames 321 and 322 and pass through the protrusion frames 321 and 322. The support hole 340 is defined to increase the coupling force between the mold portion 330 (refer to FIGS. 3 and 4) including a resin and the protrusion frame 320 (refer to FIG. 2) including a metal. The support hole 340 is engaged with the coupling projection 331 (refer to FIG. 3) of the mold portion 330 filled inside the support hole 340 to increase the coupling force between the mold portion 330 and the protrusion frame 320. In an exemplary embodiment, as illustrated in FIG. 14, in the case where the support hole 340 includes a first opening 344*a* which is defined in an upper surface of the protrusion frame 320 and has a first diameter, and a second opening 344*b* which is defined in a lower surface of the protrusion frame 320 and has a diameter larger than the diameter of the first diameter, the coupling projection 334 filling the inside of the second opening 344*b* may not be separated from the protrusion frame 320 through the first opening 344*a*, for example. By using the structural shape, the mold portion 330 and the protrusion frame 320 may be firmly coupled to each other.

The size and arrangement position of the support holes 340 may vary unrestrictedly according to the size of the display panel 200 (refer to FIG. 1), the area and rigidity of the protrusion frame 320, and the like. Various embodiments of the support hole 340 will be described below.

The support hole 340 may be generally defined using an end mill (not illustrated). The end mill is a rotary cutting tool, which has a blade at both a circumferential portion and an end portion thereof, making it possible to make a hole or to process a side surface portion of the hole. The support hole 340 may be defined by a general metal working method.

Figure 9:
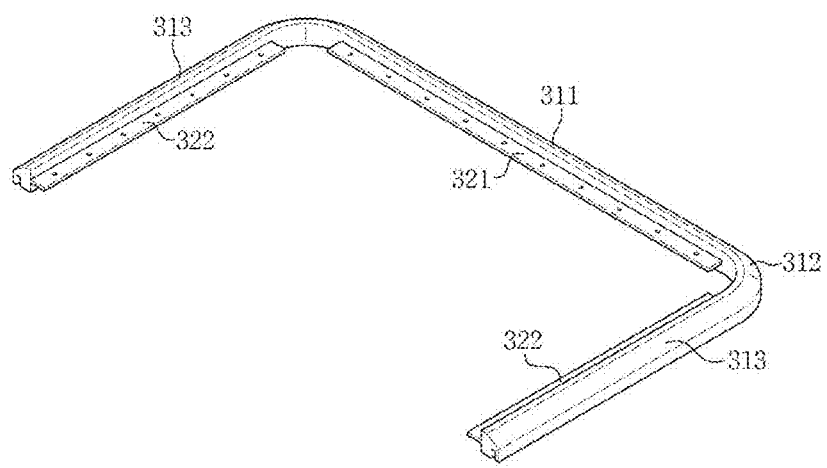
FIG. 9 is a perspective view illustrating an exemplary embodiment of a support frame and a protrusion frame.

FIG. 9 is a perspective view illustrating the support frame and the protrusion frame according to an exemplary embodiment.

FIG. 9 is a perspective view illustrating the support frame 310 (refer to FIG. 4) and the protrusion frame 320 (refer to FIG. 2) which are provided by bending the intermediate frame base 31 (refer to FIG. 6). The curved portion 312 of the support frame 310 from which the protrusion frame 320 is removed may be inwardly bendable and may be provided corresponding to a shape of an outer circumferential surface of the display panel 200 (refer to FIG. 1). In addition, the curved portion 312 of the support frame 310 may have a curvature corresponding to the curvature of the corner portion of the display panel 200. The curved portion 312 may experience structural deformation at a partial cross-section due to the bending, but have a cross-sectional area substantially equal to a cross-sectional area of the straight portions 311 and 313.

FIG. 9 shows the support frame 310 surrounding three sides of the display panel 200. The support frame 310 includes the first straight portion 311, the second straight portion 313 parallelly opposing the first straight portion 311, and the curved portion 312 connecting the first straight portion 311 and the second straight portion 313.

FIGS. 10A, 10B, 10C and 10D are views illustrating a process of joining the protrusion frame and the mold portion.

A method of forming the mold portion 330 including a resin through injection at the protrusion frame 320 (refer to FIG. 2) including a metal so that the mold portion 330 and the protrusion frame 320 are joined with each other is called a double injection method or an insert injection method.

Figure 10A:
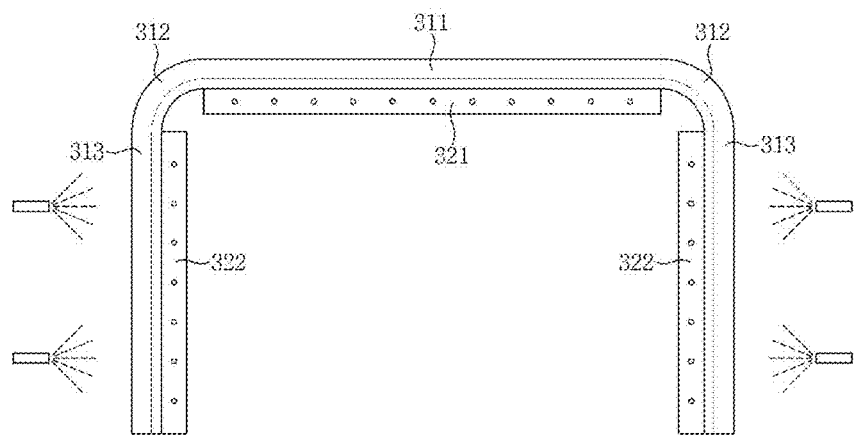
FIGS. 10A, 10B, 10C and 10D are views illustrating a process of joining the protrusion frame and the mold portion.

FIG. 10A illustrates a pretreatment step before the support frame 310 and the protrusion frame 320 are placed on an injection molding apparatus.

The pretreatment process includes a roughing process and a cleaning process.

In an exemplary embodiment, on a surface of the treated aluminum alloy may be a foreign substance or may be provided with a coating film such as an oxide film or a hydroxide. The cleaning process is a process of removing such foreign substances and coating films.

The roughing process is largely performed before the cleaning process, whereby the surface roughness of the protrusion frame 320 is secured. In an exemplary embodiment, the surface roughness of the protrusion frame 320 is adjusted by mechanical polishing, e.g., sandblasting, shot blasting, grinding and barrel machining, or chemical polishing, i.e., polishing of a surface layer.

Sandblasting is a technique of pressurizing a tank including an abrasive and then directly sending the abrasive to a nozzle using a high-pressure air such that a surface may be treated by the fine abrasive sprayed from the nozzle. Various surface treatments are possible depending on the size of the abrasive and the ejection pressure Shot blasting is a method of spraying fine metal or non-metal particles, called shot or grit, directly onto a surface of an object to be treated.

Grinding is a method of treating a surface of an object to be treated using a grinding apparatus having a rough surface that rotates.

Dissimilar to the mechanical polishing, chemical polishing is a process of roughing a surface using an etchant. In an exemplary embodiment, use of an alkaline etchant, use of an alkaline etchant in combination with an acidic etchant, and treating with an acidic etchant followed by cleaning with an alkaline solution are possible for the chemical polishing.

The alkaline etchant is not active in reaction with a metal member and thus is suitable for forming a fine roughness on a surface of a metal member. The acidic etchant is active in reaction with a metal member and thus is advantageous for performing the roughness treatment in a relatively short time.

The protrusion frame 320 which is rough-treated includes a fine groove portion defined on its surface. Accordingly, a fluid resin may be impregnated into the groove portion of the surface in the injection process to be described below such that a surface of the mold portion 330 and the surface of the metal protrusion frame 320 may be firmly joined with each other after curing.

Figure 10B:
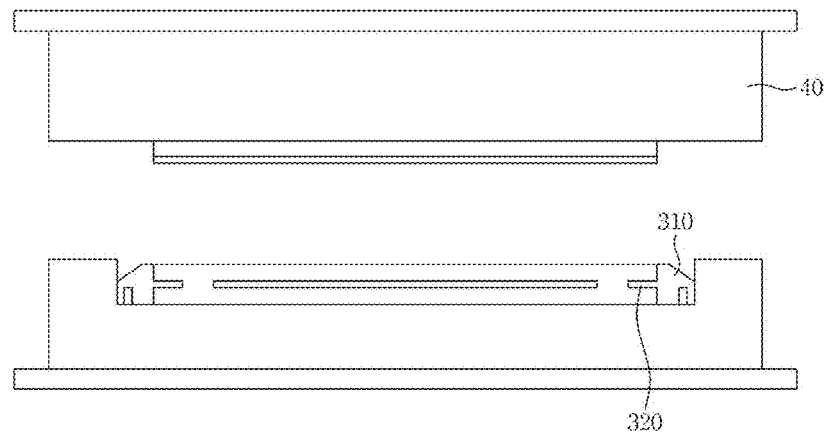

FIG. 10B illustrates a step of placing the support frame 310 and the protrusion frame 320 which are pretreated on a mold frame of an injector 40. For the insert injection process, a built-in injection mold frame, the metal protrusion frame 320 and the metal support frame 310 are joined to form a single mold frame. An empty space defined by the mold frame corresponds to a shape of the mold portion 330 (refer to FIGS. 3 and 4) to be provided.

Figure 10C:
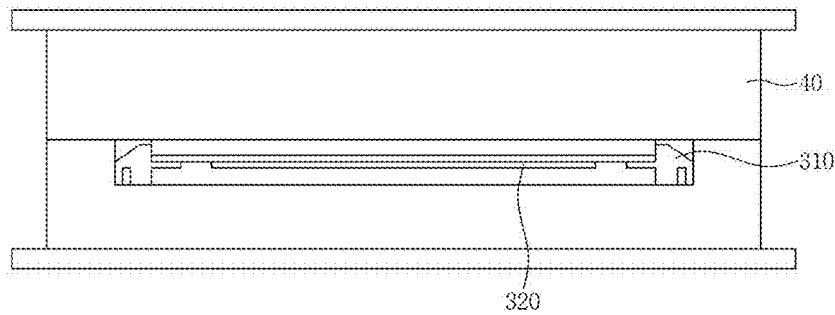

FIG. 10C illustrates an injection step for forming the mold portion 330, the mold portion 330 overlapping and being joined with the protrusion frame 320.

In a state where the protrusion frame 320 is fastened at the mold frame of the injector 40, there is an empty space inside the injector 40 at an area corresponding to the mold portion 330 (refer to FIG. 4). When a thermoplastic resin having fluidity is injected into the mold frame, the empty space is filled with the injected thermoplastic resin. After the filling is completed, the thermoplastic resin is cured to form the mold portion 330. In the cured state, the mold portion 330 and the protrusion frame 320 form a strong bonding structure.

The mold temperature and the injection nozzle temperature during the injection molding are different depending on the kind of the thermoplastic resin, but bonding is generally achieved at a temperature ranging from about 120 degrees Celsius (° C.) to about 150° C. However, in the case where the injection molding temperature is high, the metal protrusion frame 320 which is placed on the mold frame at a high temperature during the injection process maintains a thermally expanded state. After the injection process, a difference between a degree of shrinkage of the cooled protrusion frame 320 which includes a metal and a degree of shrinkage of the cooled mold portion 330 which includes a resin may cause detachment at the bonding surface in the unitary structure.

In order to substantially prevent the detachment between the different materials in the insert injection, the plurality of support holes 340 may be defined in the protrusion frame 320 according to an exemplary embodiment. That is, the mold portion 330 is completely filled in an inner space of the support hole 340 of the protrusion frame 320 in the injection process such that the protrusion frame 320 and the mold portion 330 may be substantially prevented from being detached and separated from each other.

Figure 10D:
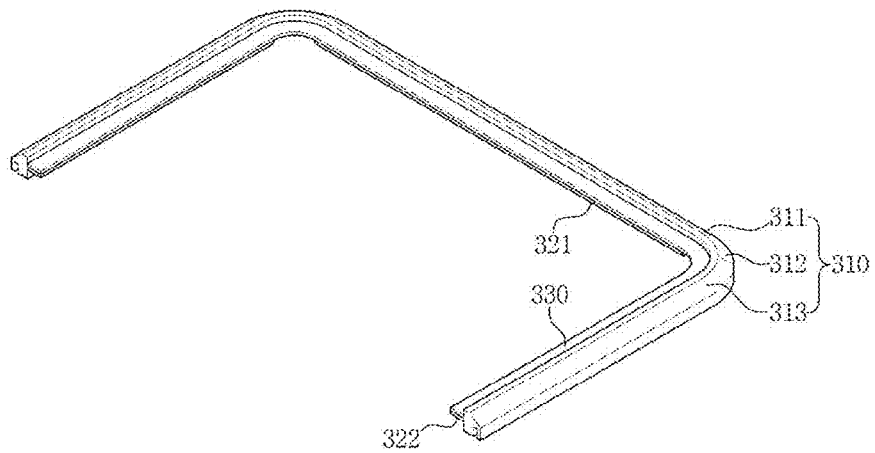

FIG. 10D is a perspective view illustrating the mold portion 330 coupled to the protrusion frame 320 (refer to FIG. 2).

Referring to FIG. 10D, the intermediate frame 300 includes the support frame 310, the first protrusion frame 321 and the second protrusion frame 322 positioned inside the support frame 310 and extending from the support frame 310, and the mold portion 330 positioned on the first protrusion frame 321 and the second protrusion frame 322 and coupled to the first protrusion frame 321 and the second protrusion frame 322.

Figure 11:
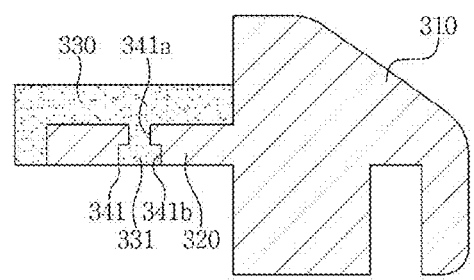
FIG. 11 is a cross-sectional view illustrating an exemplary embodiment of a support hole of the protrusion frame.

FIG. 11 is a cross-sectional view illustrating a support hole of the protrusion frame 320 according to an exemplary embodiment.

Referring to FIG. 11, a support hole 341 of the protrusion frame 320 includes an upper opening 341a defined in an upper surface of the protrusion frame 320 facing the display panel 200 (refer to FIG. 1) and a lower opening 341b defined in a lower surface of the protrusion frame 320 opposite to the upper surface. The upper opening 341a has a circular structure with a relatively narrow diameter and the lower opening 341b, located coaxially with the first opening, has a circular structure having a diameter larger than the diameter of the upper opening 341a.

The injected mold portion 330 covers an upper portion and an end portion of the protrusion frame 320 and the coupling projection 331 fills the inside of the support hole 341 of the protrusion frame 320. The mold portion 330 may be joined with the protrusion frame 320 through a surface in contact with the protrusion frame 320. However, when the insert structure is used for a long time, the bonding force at an interface may be weakened due to different characteristics of the different materials and the mold portion 330 and the protrusion frame 320 may be detached from each other. In the case where a high temperature environment and a low temperature environment are repeated, for example, the bonding force at the interface may be weakened due to a difference in thermal expansion between the materials.

In the case where the detachment between the mold portion 330 and the protrusion frame 320 occurs due to the weak bonding force at the interface, the mold portion 330 may be spaced apart from the protrusion frame 320 such that the display panel 200 together with the mold portion 330 may be separated from the intermediate frame 300.

The support hole 341 illustrated in FIG. 11 includes a first opening 341a and a second opening 341b having a diameter larger than a diameter of the first opening 341a. The coupling projection 331 of the mold portion 330 is provided by filling both the first opening 341a and the second opening 341b. Although detachment occurs at the interface between the mold portion 330 and the protrusion frame 320, the coupling projection 331 filling the second openings 341b may not pass through the first openings 341a and thus the mold portion 330 may not be separated from the protrusion frame 320.

Figure 12:
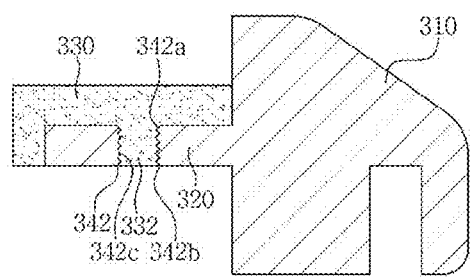
FIG. 12 is a cross-sectional view illustrating an exemplary embodiment of a coupling structure of a protrusion frame and a mold portion.

FIG. 12 is a cross-sectional view illustrating a coupling structure of the protrusion frame and the mold portion according to an exemplary embodiment.

Referring to FIG. 12, a support hole 342 of the protrusion frame 320 includes a first opening 342a defined in an upper surface of the protrusion frame 320 facing the display panel 200 (refer to FIG. 1) and a second opening 342b defined in a lower surface of the protrusion frame 320 opposite to the upper surface. The first opening 342a and the second opening 342b of the support hole 342 are defined to have a substantially equal diameter but a screw thread 342c may be defined at an inner portion of the support hole 342. A rotation direction of the screw thread 342c may be either the right direction or the left direction. In an exemplary embodiment, the screw thread 342c may be provided using, for example, a female screw tap tool.

The screw thread 342c provided at the support hole 342 is firmly engaged with a coupling projection 332 of the mold portion 330 so that the mold portion 330 may be fixed to the protrusion frame 320 not to be separated therefrom.

Figure 13:
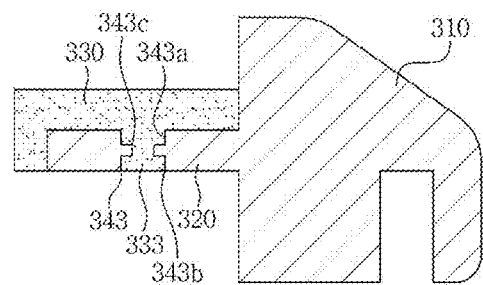
FIG. 13 is a cross-sectional view illustrating an exemplary embodiment of a coupling structure of a protrusion frame and a mold portion.

FIG. 13 is a cross-sectional view illustrating a coupling structure of the protrusion frame 320 and the mold portion according to an exemplary embodiment.

Referring to FIG. 13, a support hole 343 of the protrusion frame 320 includes a first opening 343a defined in an upper surface of the protrusion frame 320 facing the display panel 200 (refer to FIG. 1) and a second opening 343b defined in a lower surface of the protrusion frame 320 opposite to the upper surface. In addition, the support hole 343 includes therein a protrusion ring 343c protruding from an inner circumferential surface of the support hole 343. The protruding ring 343c divides an inner space of the first opening 343a and the second opening 343b and is capable of fixing the coupling protrusion 333 filled in the support hole 343.

Although one protrusion ring 343c which is easy to process is illustrated in FIG. 13 by way of example, a plurality of protrusion rings 343c may be provided depending on the thickness and strength of the protrusion frame 320. In addition, the protrusion ring 343 need not necessarily be a complete circle, but may have a circular arc shape in a plan view.

FIG. 14 is a cross-sectional view illustrating a coupling structure of the protrusion frame 320 and the mold portion according to an exemplary embodiment.

Referring to FIG. 14, a support hole 344 of the protrusion frame 320 includes a first opening 344a defined in an upper surface of the protrusion frame 320 facing the display panel 200 (refer to FIG. 1) and a second opening 344b defined in a lower surface of the protrusion frame 320 opposite to the upper surface. The support hole 344 has a truncated cone shape in which a diameter continuously increases from the first opening 344*a* to the second opening 344*b*. The inside of the support hole 344 is filled with a coupling projection 334.

The support hole 344, having a truncated cone shape, may firmly couple the protrusion frame 320 and the mold portion 330 to each other and fix the mold portion 330 so that the mold portion 330 may not be separated from the protrusion frame 320 during use.

Figure 15:
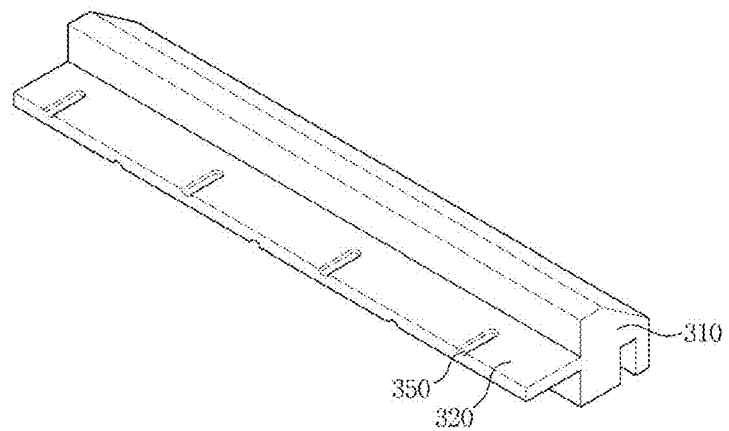
FIG. 15 is a perspective view illustrating an alternative exemplary embodiment of a support frame.

FIG. 15 is a perspective view illustrating a support frame according to an alternative exemplary embodiment.

Referring to FIG. 15, a coupling groove portion 350 may be positioned in an upper portion or a lower portion of the protrusion frame 320. The coupling groove portion 350 may extend from an end portion of the protrusion frame 320 toward the support frame 310.

The coupling groove portion 350 may increase a surface area of the protrusion frame 320 to increase the coupling force. In addition, in the case where the protrusion frame 320 including a metal expands along the extending direction of the protrusion frame 320 in a high temperature environment, a coupling projection (not illustrated) filled in the coupling groove portion 350 suppresses the expansion of the protrusion frame 320 such that the protrusion frame 320 may be substantially prevented from being detached from the mold portion 330.

In the case where the coupling groove portions 350 are positioned in corresponding positions on the upper and lower surfaces of the protrusion frame 320, the protrusion frame 320 may have a thinner portion and the rigidity of the protrusion frame 320 may be weakened structurally. Accordingly, it is desirable that the coupling groove portions 350 have a staggered arrangement on the upper surface and the lower surface of the protrusion frame 320.

A depth of the coupling groove portion 350 may be equal to or less than about a half of the thickness of the protrusion frame 320, but may have a depth greater than about a half thereof depending on the strength of the material of the protrusion frame 320.

Figure 16:
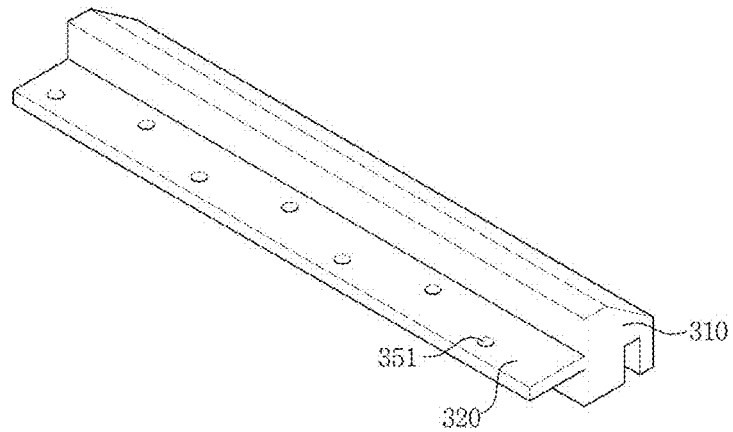
FIG. 16 is a perspective view illustrating an alternative exemplary embodiment of a support frame.

FIG. 16 is a perspective view illustrating a support frame according to an alternative exemplary embodiment.

Referring to FIG. 16, a coupling groove portion 351 may be defined in an upper portion or a lower portion of the protrusion frame 320. The mold portion 330 (refer to FIGS. 11 to 14) positioned on the protrusion frame 320 is filled in an inner space of the coupling groove portion 351 in the injection process.

The coupling groove portion 351 may increase a surface area of the protrusion frame 320 to increase the coupling force. In addition, in the case where the protrusion frame 320 including a metal expands along the extending direction of the protrusion frame 320 in a high temperature environment, the mold portion 330 filled in the coupling groove portion 351 suppresses the expansion of the protrusion frame 320 such that the protrusion frame 320 may be substantially prevented from being detached from the mold portion 330.

Although FIG. 16 illustrates the coupling groove portion 351 having a circular structure in a plan view, the coupling groove portion 351 may have various shapes such as an elliptical shape and a quadrangular shape in a plan view, for example. In addition, the coupling groove portions 351 may be arranged in a zigzag manner as illustrated, or may be arranged in one or two columns.

Figure 17:
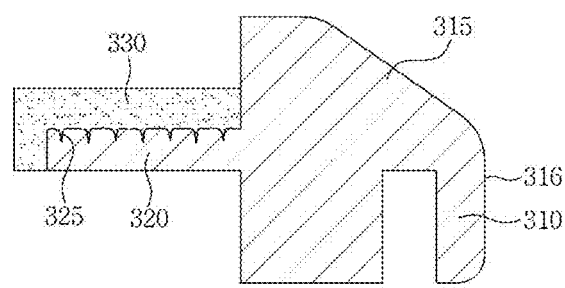
FIG. 17 is a cross-sectional view illustrating another alternative exemplary embodiment of a support frame.

FIG. 17 is a cross-sectional view illustrating a support frame according to another alternative exemplary embodiment.

Referring to FIG. 17, a fine groove portion 325 may be defined in a contact surface of the protrusion frame 320 that contacts the mold portion 330. An inner space of the fine groove portion 325 defined in the surface of the protrusion frame 320 is filled with the mold portion 330 in the injection process such that the coupling force with the mold portion 330 may be improved.

A method of defining the fine groove portion 325 at the surface of the protrusion frame 320 may employ, for example, sandblasting, acid treatment or polishing.

Sandblasting is a technique of pressurizing a tank including an abrasive and then directly sending the abrasive to a nozzle using a high-pressure air such that a surface may be treated by the fine abrasive ejected from the nozzle. Various surface treatments are possible depending on the size of the abrasive and the ejection pressure.

Further, the surface may be roughened through chemical polishing. In an exemplary embodiment, use of an alkaline etchant, use of an alkaline etchant in combination with an acidic etchant, and treating with an acidic etchant followed by cleaning with an alkaline solution are possible for the chemical polishing.

In general, it is more advantageous in securing the coupling force to form the fine groove portion 325 by using a chemical method rather than a physical method, but it is also possible to treat the surface by applying the physical method and the chemical method together.

In an exemplary embodiment, depending on the design of the display device, an upper surface portion 315 of the support frame 310 or a portion of a side surface portion 316 of the support frame 310 not facing the display panel 200 may be exposed to the outside The surface treatment of the support frame 310, provided through the extrusion process, may be performed substantially simultaneously with the surface treatment of the protrusion frame 320. In an alternative exemplary embodiment, the support frame 310 may be subjected to an individual surface treatment after formation of the mold portion 330.

In general, the surface treatment of the protrusion frame 320 is intended to define fine grooves to increase the roughness of the surface in order to strengthen the coupling with the mold portion 330, while the surface treatment of the support frame 310 is mainly intended to reduce the roughness of the surface to make it glossy for the purpose of providing the aesthetic sense of appearance.

In an exemplary embodiment, the surface treatment of the support frame 310 to provide the aesthetic sense of appearance may include, for example, a polishing treatment, a pattern forming treatment, a sandblasting treatment and the like.

The polishing treatment is a method of smoothening the surface of a metal by using abrasive stones and combinations and is mainly used for polishing.

The pattern forming treatment is a method of forming a predetermined pattern on a metal surface by using a brush, sandpaper, or the like. The pattern forming treatment is used for a surface treatment in a matt state and is mainly used for producing a surface effect such as a hair line.

The sandblasting treatment is a technique of treating a surface by spraying a fine abrasive on a metal surface, which is used to provide a matte aluminum feel.

Figure 18:
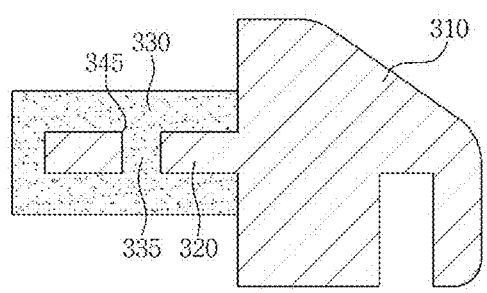
FIG. 18 is a cross-sectional view illustrating another alternative exemplary embodiment of a support frame.

FIG. 18 is a cross-sectional view illustrating a support frame according to another alternative exemplary embodiment.

Referring to FIG. 18, the mold portion 330 covers an upper surface, a lower surface and a cross-section of the protrusion frame 320 all together. In addition, a coupling projection 335 of the mold portion 330 fills an inner space of a support hole 345 of the protrusion frame 320. The coupling projection 335 is connected to the mold portions 330 located on the upper surface and the lower surface of the protrusion frame 320 through an upper opening and a lower opening of the support hole 345.

The mold portion 330 is unitary (i.e., in a monolithic structure) through the support hole 345, thus capable of being firmly coupled with the protrusion frame 320.

Figure 19A:
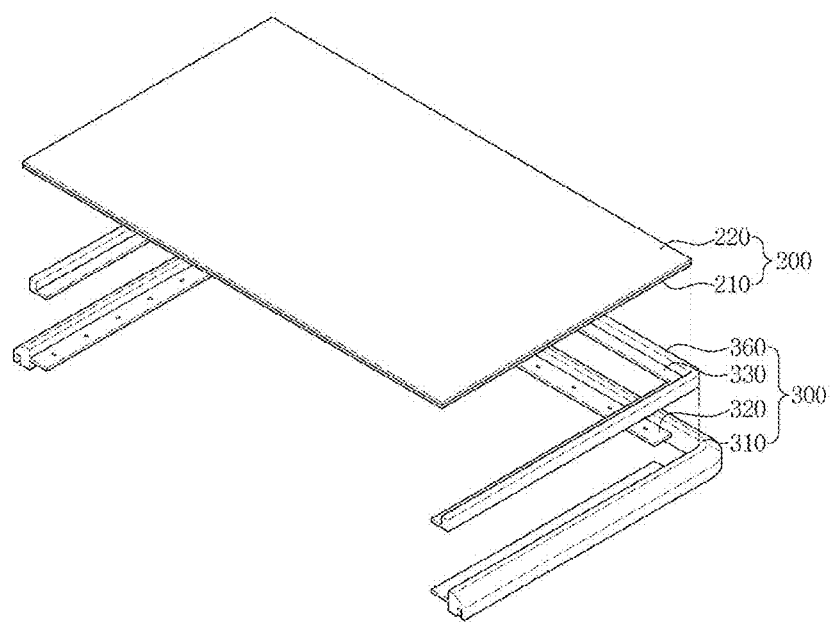
FIG. 19A is a perspective view illustrating another alternative exemplary embodiment of a mold portion and a support frame.

FIG. 19A is a perspective view illustrating a mold portion and a support frame according to another alternative exemplary embodiment.

Figure 19B:
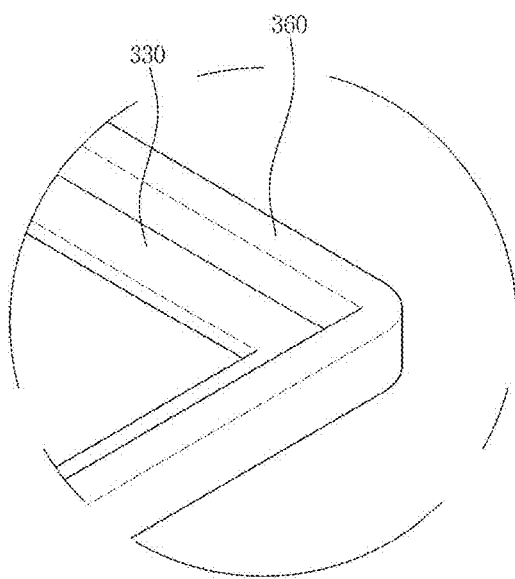
FIG. 19B is an enlarged view of the mold portion of FIG. 19A.

FIG. 19B is an enlarged view of the mold portion of FIG. 19A.

Referring to FIGS. 19A and 19B, the display panel 200 includes a first substrate 210 and a second substrate 220 having a quadrangular shape in a plan view and a corner portion of the display panel 200 is provided at right angles.

The intermediate frame 300 includes the support frame 310, the protrusion frame 320, the mold portion 330 and a mold filling portion 360 on the mold portion 330.

The display panel 200 is placed at a concave inner space defined by the mold portion 330 and the mold filling portion 360. The mold filling portion 360 surrounds the display panel 200 along an outer side surface of the display panel 200. Accordingly, the mold filling portion 360 is provided in a shape substantially equal to the shape of the display panel 200 along an edge of the display panel 200. One inner side surface of the mold filling portion 360 is provided at a right angle at a corner portion of the display panel 200 similar to the display panel 200. A surface of the mold filling portion 360 opposite to a surface of the mold filling portion 360 facing the display panel 200 faces an inner side surface of the support frame 310. One outer side surface of the mold filling portion 360 has a curvature substantially equal to a curvature of the support frame 310. The mold filling portion 360 faces, on a same height, both the support frame 310 having a curved surface and the display panel 200 having a right-angled corner. In the case where the display panel 200, having a curvature different from a curvature of the support frame 310 which is provided by extrusion, is placed at an inner side surface of the support frame 310, the mold filling portion 360 serves so that a space is not generated between an edge of the display panel 200 and the inner side surface of the support frame 310. Although the display panel 200 having a quadrangular shape in a plan view is illustrated in FIGS. 19A and 19B by way of example, the mold filling portion 360 may be used to place a round-type display panel 200 thereon in which a curvature of the display panel 200 and a curvature of the support frame 310 do not coincide with each other. In addition, the mold filling portion 360 and the mold portion 330 may be unitarily provided through an injection process.

As set forth hereinabove, in an intermediate frame of a display device according to one or more exemplary embodiments, detachment between a metal frame and a resin mold portion may be substantially prevented. To substantially prevent the detachment, a support frame and a protrusion frame are unitarily provided through an extrusion process, a portion of the support frame from which the protrusion frame is removed is bent, a mold portion is insert-injected at the protrusion frame to form a unitary structure, and a support hole is defined in the protrusion frame.

While the invention has been illustrated and described with reference to the exemplary embodiments thereof, it will be apparent to those of ordinary skill in the art that various changes in form and detail may be formed thereto without departing from the spirit and scope of the invention.

What is claimed is:

1. A display device comprising: a display panel sandwiched between an upper frame and a support frame; the support frame comprising a plurality of straight portions located at two adjacent outer side edges of the display panel and having a substantially equal cross-section and a curved portion connecting the plurality of straight portions and having a curvature; a plurality of protrusion frames each extending from a straight portion of the plurality of straight portions of the support frame toward an inner portion of the display panel opposite to the upper frame; and a plurality of support holes arranged along an extending direction of the protrusion frame is defined in the protrusion frame, each of the support holes has an opening of which a diameter continuously increases from a top surface to a bottom surface; and a mold portion overlapping the top surface of the plurality of protrusion frames to be joined with the plurality of protrusion frames and being located along an inner surface of the curved portion of the support frame, wherein at least one of the plurality of protrusion frames is not provided at the curved portion of the support frame, and wherein the protrusion frames, among the plurality of protrusion frames, extending from straight portions, among the plurality of straight portions, immediately next to each other, do not contact each other, and having a gap; the mold portion continuously covers the gap and the protrusion frames and fills the support holes.

2. The display device as claimed in claim 1, wherein the straight portion and the curved portion of the support frame have a substantially equal cross-sectional area.

3. The display device as claimed in claim 2, wherein the straight portion and the curved portion of the support frame are unitary.

4. The display device as claimed in claim 3, wherein a protrusion frame of the plurality of protrusion frames and the straight portion of the support frame are unitary.

5. The display device as claimed in claim 3, wherein the mold portion contacts an inner side of the curved portion of the support frame.

6. The display device as claimed in claim 3, wherein the support frame and the protrusion frame comprise aluminum or an aluminum alloy.

7. The display device as claimed in claim 5, wherein the mold portion comprises at least one of resins based on polyethylene, polymethacryl, polyacryl, polyolefin, polyurethane, polyester and polyamide.

8. The display device as claimed in claim 5, wherein the mold portion includes a material having lower thermal conductivity and superior ductility than those of the plurality of protrusion frames.

9. The display device as claimed in claim 1, wherein the support hole comprises at least one of a screw thread or a protruding portion therein.

10. The display device as claimed in claim 3, wherein a surface roughness of the protrusion frame is greater than a surface roughness of the support frame.

11. The method as claimed in claim 5, wherein the mold portion is continuously extends along the inner surface of the straight portion and the curved portion of the support frame.

* * * * *